US009856442B1

(12) United States Patent
Anselmo

(10) Patent No.: US 9,856,442 B1

(45) Date of Patent: Jan. 2, 2018

(54) WINDSHIELD WASHER PREPARATION AND A METHOD TO MAKE THE PREPARATION

(71) Applicant: Antonio Philippe Anselmo, Larchmont, NY (US)

(72) Inventor: Antonio Philippe Anselmo, Larchmont, NY (US)

( * ) Notice: Subject to any disclaimer, the term of this patent is extended or adjusted under 35 U.S.C. 154(b) by 0 days.

(21) Appl. No.: 15/218,047

(22) Filed: Jul. 24, 2016

(51) Int. Cl.

| | |
|---|---|
| ***A47L 1/00*** | (2006.01) |
| ***A47L 1/08*** | (2006.01) |
| ***A47L 1/09*** | (2006.01) |
| ***A47L 1/13*** | (2006.01) |
| ***A47L 4/00*** | (2006.01) |
| ***C11D 3/43*** | (2006.01) |
| ***C11D 11/00*** | (2006.01) |
| ***C11D 3/20*** | (2006.01) |
| ***B01J 8/02*** | (2006.01) |
| ***B05B 7/24*** | (2006.01) |
| ***B05B 11/00*** | (2006.01) |
| ***B67D 3/00*** | (2006.01) |

(52) U.S. Cl.

CPC ......... *C11D 11/0035* (2013.01); *B01J 8/0278* (2013.01); *B01J 8/0285* (2013.01); *B05B 7/2494* (2013.01); *B05B 11/30* (2013.01); *B67D 3/0051* (2013.01); *C11D 3/2006* (2013.01); *C11D 3/2068* (2013.01); *C11D 3/2093* (2013.01); *B01J 2208/00893* (2013.01)

(58) Field of Classification Search

CPC ..... A47L 1/00; A47L 1/08; A47L 1/09; A47L 1/13; A47L 4/00; C11D 3/201; C11D 3/2068; C11D 3/43; C11D 7/263; C11D 7/5004; C11D 7/5007; C11D 7/5086; C11D 11/0035

See application file for complete search history.

(56) References Cited

U.S. PATENT DOCUMENTS

| | | | | |
|---|---|---|---|---|
| 3,988,264 A * | 10/1976 | Werzner | C11D 1/22 | 510/182 |
| 5,932,529 A * | 8/1999 | Storey | C11D 3/2006 | 134/34 |
| 2009/0018044 A1 * | 1/2009 | Dreja | C11D 3/0073 | 510/279 |

* cited by examiner

*Primary Examiner* — Charles Boyer

(57) ABSTRACT

The invention is a windshield washer preparation, a method for producing the preparation and a device that produces the preparation. The method uses the dehydration of methanol and distillation of dimethyl ether to produce the preparation and a propellant for pressurized packaging. The washer preparation contains deionized water, methanol, dimethyl ether, dimethyl carbonate and additional compounds selected from the group consisting of dyes, de-foaming agents and surfactants. The disclosed method and device can formulate varying combinations of methanol, deionized water and dimethyl ether using the methanol dehydration reaction prior to the addition of dimethyl carbonate. The preparation can be used in automobile washer reservoirs or directly on the windshield using trigger spray applicators or an aerosol can. The excess dimethyl ether from the method can be used taken from the system and stored for future use.

12 Claims, 3 Drawing Sheets

WINDSHIELD WASHER PREPARATION AND A METHOD TO MAKE THE PREPARATION

CROSS-REFERENCED TO RELATED APPLICATIONS

The application claims the benefit of U.S. Provisional application, with Application No. 62/196,318 filed Jul. 24, 2015, the contents of which are incorporated herein by reference thereto in their entirety.

FEDERALLY SPONSORED RESEARCH

There has been no government support for this invention.

FIELD OF THE INVENTION

The present invention relates to vehicle glass cleaning, and more particularly to windshield washer preparations mixed using a method and a device to produce the washer preparation. The present invention describes a device that uses the method, capable of producing the desired windshield washer preparation. The method and device disclosed fabricate varying combinations of methanol, deionized water and dimethyl ether using the methanol dehydration reaction prior to the addition of dimethyl carbonate. The washer preparation contains deionized water, methanol, dimethyl ether, dimethyl carbonate and additional compounds selected from the group consisting of dyes, defoaming agents and surfactants. The preparation is formulated with three solvents, each solvent capable of cleaning different types of materials at different temperatures while effectively removing ice from the windshield.

BACKGROUND OF THE INVENTION

It is known in the prior art that windshield washer preparations are fluids carried by motor vehicles used for removing solid debris, cleaning windshield grime and deicing the windshield glass. Windshield washer preparations are used with the wiper blades while the vehicle is either stationary or in motion. Windshield washer fluid is sold in many formulations, and some may require dilution before being applied, although most solutions available in North America come premixed with no diluting required.

Automobile wash systems operate by pumping a small jet of fluid from a nozzle over the area of windshield glass contacted by the windshield wipers. The washer preparation, wiper arm and application nozzle system are also used on rear view windows, headlamps and on-board cameras. These wiper systems are also used on trains, aircraft, watercraft and other types of windscreens that need immediate cleaning. Windshield washer preparations are crucial for removing obscuring material from the windshield so the vehicle can be operated safely.

Washer preparations assist the windshield wipers as the wiper bar removes vision obscuring materials from the from the driver's line of sight. Vision obscuring materials include dirt, grime, insect material, pollen, sap, road-tar, oil, frost, ice, snow and combinations thereof. These materials are mixed with various amounts of turgid water impinging the windshield from weather or road related sources. The adhesive force of obscuring materials greatly varies depending on the temperature of the windshield surface and the ambient temperature of the surrounding air.

Vision obscuring materials can be broken down into four specific groups. The first group consist of the different forms of water, which include ice, snow, sleet, hail, salt water sprays, turgid water and any other combination impinging the windshield. The second group consists of inorganic compound that include grime, oils, road tars, rock dust, fine sand and other materials associated with roadways. The third group included organic materials associated with bug impacts, bird droppings, farm dirt, pollen, tree sap and other compounds associated with the driving locale that may impinge the windshield. Organic compound largely consist of proteins, sugars, lipids and complex carbohydrates. The fourth group includes waxes, polymers and other compounds used for automobile care that reduce driver visibility.

A traditional windshield washer composition contains 18% to 49% by volume methanol with the balance being water, a small amount of surfactant and a small amount of colorant. That fluid has an expected freezing point of −15° C. to −40° C. Traditional cleaners for automotive applications, although they are satisfactory in removing inorganic soils from hard surfaces, are often unsatisfactory in removing organic soils. In order to address all four categories, windshield washer preparation must not only remove both organic and inorganic materials, but also act as an antifreeze and ice remover.

A washer preparation that may be effective at above freezing temperatures may be ineffective at temperatures below freezing. In particular, combined mixtures of water and organic materials impinging the windshield at low temperatures are particularly difficult because the material becomes highly viscous. For example, drilling mud can have a kinematic viscosity 3 to 4 cSt. at 20° C., while at 0° C., the same materials have viscosity 7 to 18 cSt. As a reference, liquid water has a viscosity of 0.894 cSt.

The less effective washer preparations make removing vision obscuring materials difficult and will cause undesired delays due to the time it takes to remove the material. All vehicle operators' benefit from a windshield washer preparation that reduced the amount of undesired delays, the amount of windshield washer fluid used and the amount of mechanical action necessary to restore clarity to the windshield.

Another method for removing organic soils from automotive surfaces involves the use of compositions containing enzymes. The reaction time for enzyme for dissolving lipids and proteins deposited by insect strikes are long. Tree sap, pollen and pine tar require alternative solvents capable of quickly removing these materials.

Windshield washer fluid makers have also reformulated preparations with low volatile organic compounds ("VOC"). In some regions of the United States, this limit can be as low 1% VOC's by weight. Thus, a problem currently facing manufacturers of windshield washer preparations is the need to comply with the new VOC restrictions while, at the same time, maintaining cleaning effectiveness. This problem is especially significant with respect to cleaning products for automotive applications.

Washer preparations may sometimes be preheated before being delivered onto the windshield. This is especially desirable in colder climates when a thin layer of ice or frost accumulates on the windshield's surface, because it eliminates the need to manually scrape the windshield or pour warm water on the glass. Although there are some after market preheat devices available, many automobile makers offer this feature factory installed on at least some of their vehicles. Different system patented alternately spray standard washer fluid and a strong de-icing formulated washer fluid on to the windscreen.

There is a need for a preparation to aggressively remove protein and lipids from the hard surface of a windshield over a range of temperatures. There is a need for a preparation to remove organic gums, tars and pollens over a range of temperatures that accumulate on vehicle surfaces. There is a need for a preparation to remove grime and debris without causing surface paint damage. There is also a need for a preparation that can meet the volatile organic limits in various jurisdictions.

It is another objective that the process used to produce the cleaning preparation can also produce a propellant that can be used with the windshield washer preparation. It is another objective of the invention to package the cleaning preparation in containers at pressures of 1 bar or at pressures above 3 bar to 6 bar using a propellant produced during the process used to produce the washer preparation. It is also the objective that the propellant is water-soluble.

SUMMARY OF THE EMBODIMENTS

A first embodiment includes a windshield washer preparation comprising of methanol, dimethyl ether and de-ionized, pure water generated via the dehydration of methanol. The present invention discloses the cleaning preparation also consists of dimethyl carbonate as an additional solvent along with additives selected from a group consisting of surfactants, dyes, fragrances, de-ionized water, mono-alcohols and foam reduction agents.

Dimethyl ether is an ingredient that effectively dissolves lipids and proteins contained in impinging debris, while improving the wetting of glass surfaces at temperatures below 0° C. Dimethyl ether is both an excellent solvent and an excellent propellant. Dimethyl carbonate is a solvent that can remove gums, tree resins, road tar and other adhesive materials. Dimethyl carbonate is exempt from volatile organic compound limits in most jurisdictions in North America and Europe. Both solvents are environmentally benign and cannot poison ground water.

The preparation is derived from the dehydration of methanol, yielding a mix of dimethyl ether and water along with residual methanol. The mixture of methanol, dimethyl ether and water is combined with dimethyl carbonate and supplemented with additional water and additives.

The preparation can be packaged for use in automobile windshield spray systems, stored in simple jugs at atmospheric pressure. The preparation can also be applied to windshield using a trigger spray applicator that is filled at atmospheric pressure. The invention can also separates out dimethyl ether that can be used as a propellant for pressurized application of the preparation on windshields using an aerosol can.

DETAILED DESCRIPTION OF THE DRAWINGS

Figure 1:
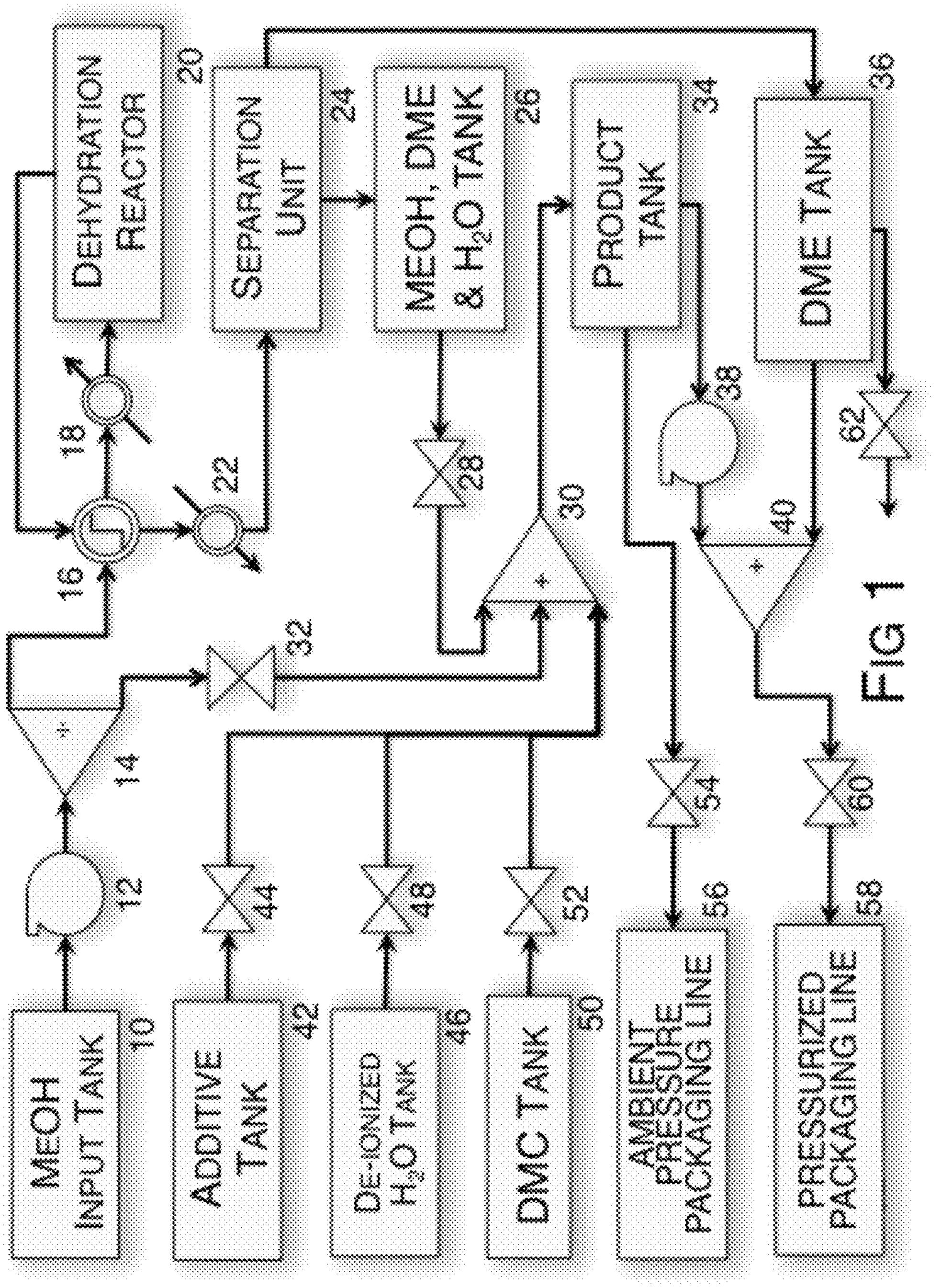
FIG. 1 is a diagram showing the process flow and the components for dehydrating methanol into a mixture of water, methanol and dimethyl and separating out concentrated dimethyl ether from a mixture of methanol, water and dimethyl ether, combined with additional additives, constituting the cleaning preparation in one embodiment of the present invention.

The present invention is a windshield washer preparation for glass surfaces, which is composed of water, methanol, dimethyl ether and dimethyl carbonate. In FIG. 1, for the purpose of this invention, the definition of MeOH is methanol; the definition of DME is dimethyl ether; the definition of DMC is dimethyl carbonate and the definition of $H_2O$ is water.

In this embodiment, FIG. 1, the methanol from the input tank 10 is transported to a pump 12 and pressurized above 10 bar, up to about 20 bar. The pressurized liquid methanol is piped to a controllable flow splitter 14 connected to a pipe connected to a heat exchanger 16. The controllable flow splitter 14 is also connected to a second pipe connected to a flow control valve 32. The methanol stream exiting the heat exchanger 16 is heated and transported in an insulated pipe to an additional heat source 18 and heated above 175° C., up to about 250° C. Vaporized methanol enters the dehydration reactor 20 containing the catalyst. The reactor contains a suitable catalyst for methanol dehydration. The reactor converts 50% to 85% of the methanol to dimethyl ether and water by molar fraction.

The reaction is exothermic and the water, methanol and dimethyl ether vapor is transported via an insulated pipe to the heat exchanger 16, counter flowing with the liquid methanol entering the other port of the heat exchanger. After the vapor mixture is cooled by the heat exchanger, the vapor is further cooled by a chiller 22 and transported by insulated pipes to the separation unit 24. The separation unit 24 splits the stream into a bottom fluid stream consisting of water, methanol and some dimethyl ether and a top output stream of with a molar fraction of greater than 98.5% dimethyl ether.

The bottom stream from the separation unit 24 is piped to the MeOH, DME & $H_2O$ tank 26. The dimethyl ether stream from the separation unit 24, with a molar fraction greater than 98.5%, is transported with an insulated pipe to a dimethyl ether holding tank 36. Dimethyl ether can be removed from the system for alternative use using a valve 62 connected to an outlet.

In FIG. 1, the contents originating from the MeOH, DME & $H_2O$ tank 26 is transported to a flow control unit 28 by a pipe. The flow controller 28 is connected to a 6 port controllable fluid mixer 30. The 6 port controllable fluid mixer 30 is comprised of 5 input ports and 1 output port. The additive tank 42 contains compounds selected from a group consisting of foam suppression agents, surfactants, dyes, and scents. The additive tank 42 is connected to a flow controller 44, which is connected to a port on the controllable fluid mixer 30.

A deionized water tank 46 is connected to a flow controller 48, which is connected by a pipe to a port on the controllable fluid mixer 30. A dimethyl carbonate tank 50 is connected to a flow controller 52, which is connected by a pipe to a port on the controllable fluid mixer 30. The methanol bypass side stream originating from fluid splitter 14 is connected to a flow controller 32, which is connected by a pipe to a port on the mixer 30.

The output port of the controllable fluid mixer 30 is connected to the final product tank 34. The windshield washer preparation held in the tank meets the criteria for the specific product batch that will be packaged during the product run. The windshield washer preparations that are stored at atmospheric pressure are transferred to the ambient pressure packaging line 56 from the flow control valve 54 that is connected to the product tank 34. The cleaning preparations that are stored at pressures above 3 bar are transferred to the pressurized packaging line 58 from the flow control valve 60 that is connected to a pressurized fluid combiner 40. The pressurized fluid combiner 40 is supplied with windshield washer preparation from a pressurizing pump 38, the pressurizing pump transporting the windshield washer preparation stored in the product tank 34. The excess dimethyl ether held the DME tank 36, not used for the pressurized packaging line 58, is released through flow control valve 62, which is connected to an external port.

Figure 2:
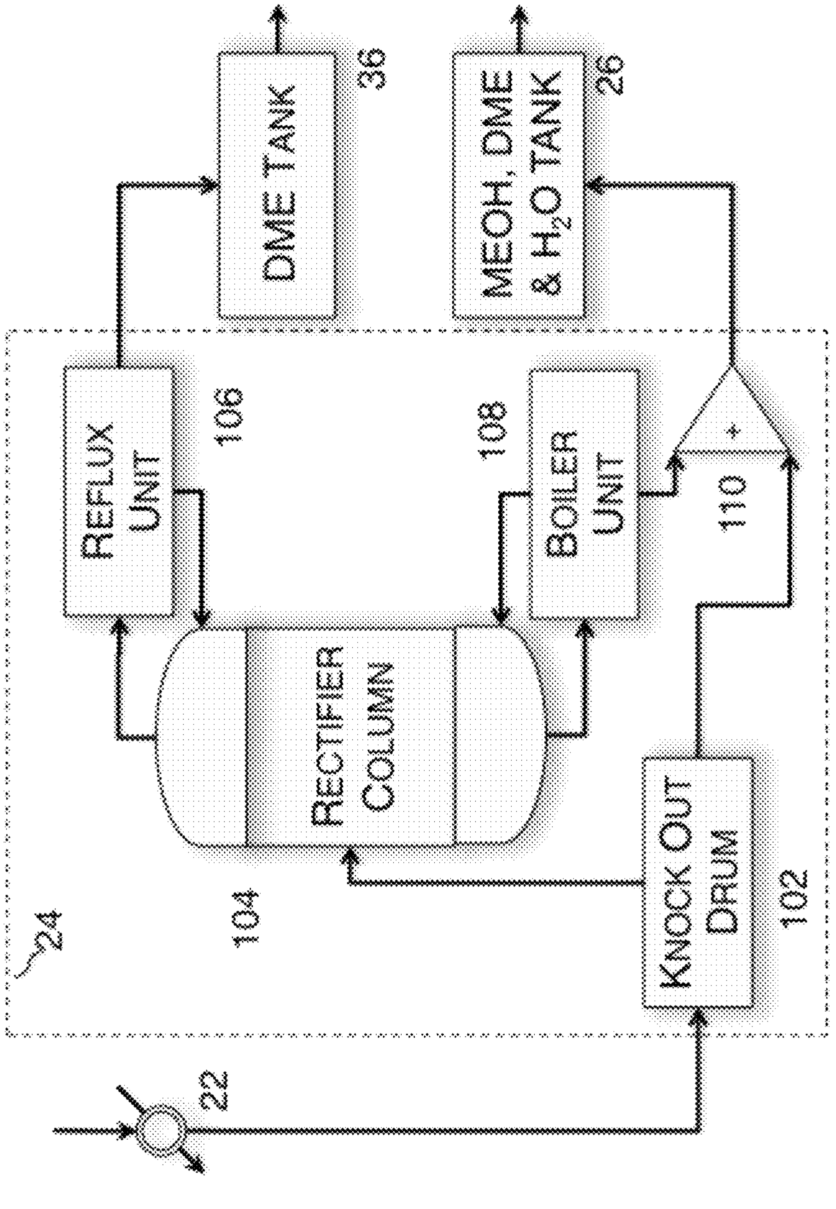
FIG. 2 is a diagram showing one embodiment of separation unit consisting of one knock out drum and a single rectifying column.

In FIG. 2, the internal process of the separation unit 24 is described. The separation unit is supplied with the resultant vapor produced by the reactor 20, which is passed through a chiller 22, reducing the temperature to a range between 10° C. and 40° C. Inside the separation unit 24, one knock out drum 102 is used in conjunction with one rectifier column 104. The vapor output from the knock out drum 102 is piped into the rectifying column 104. In this embodiment, the single rectifier column is heated by a single boiler unit 108 connected to the bottom of the rectifier column and a single reflux unit 106 connected to the top of the rectifier column 104. The output at the top of the column is a concentrated dimethyl ether stream, with a molar fraction above 98.5% and below 99.9999%. In other embodiments, the separation unit 24 can be composed of many knock out drums 102 connected to many rectifier columns 104.

In FIG. 2, the dimethyl ether stream from the reflux unit 106 flows out from the separation unit 24 into the DME tank 36. The dimethyl ether stored in the DME tank 36 is a solvent and a propellant for pressurized packaging. The bottom stream from the separation unit 24 is a composition of water, methanol and dimethyl ether combined with the bottom stream from the knock out drum 102 with a controllable fluid combiner 110. The stream output at the bottom of the rectifying column has a molar fraction composition of 0.001% to 50% methanol, 0.001% to 90% water and 0.001% to 10% dimethyl ether. The output from the controllable fluid combiner 110 delivered into the MeOH, DME & $H_2O$ tank 26.

In FIG. 1, the ambient pressure packaging line 56 is supplied with the windshield washer preparation from a line connected to the flow control valve 54. The pressurized packaging line 58 is supplied with windshield washer preparation and propellant from the flow control valve 60 connected to the pressurized controllable fluid mixer 40.

Figure 3A:
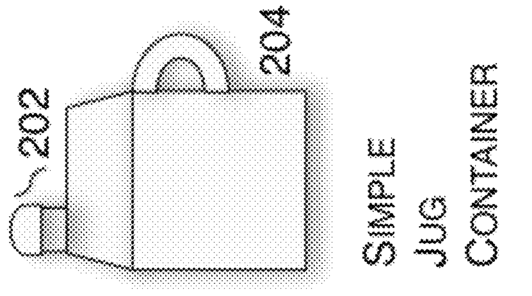
FIG. 3*a* shows a side view of an ambient pressure jug container for distribution of the washer preparation in one embodiment of the present invention.

FIG. 3*a* shows a simple jug container 204 that holds the washer preparation at atmospheric pressure. The jug container can be constructed of materials selected from the group consisting of polymers, metals, glass and carbon composites. The jug container is filled at atmospheric pressure with the window cleaning preparation in the ambient pressure packaging line 56 and is capped with a top 202 constructed from materials of selected from the group consisting polymers, metals, glass and carbon composites.

Figure 3B:
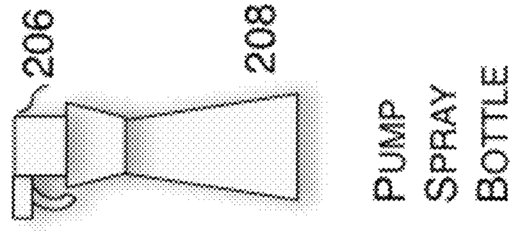
FIG. 3*b* shows a side view of an ambient pressure adjustable spray bottle for the application of the washer preparation in one embodiment of the present invention.

FIG. 3*b* shows a trigger spray container 208 that holds the washer preparation at atmospheric pressure. The trigger spray container can be constructed materials of selected from the group consisting of polymers, metals, glass and carbon composites. The trigger spray container is filled at atmospheric pressure with the washer preparation in the ambient pressure packaging line 56 and is capped with a tamper proof, adjustable spray top 206 constructed from materials of selected from the group consisting polymers, metals, glass and carbon composites.

Figure 3C:
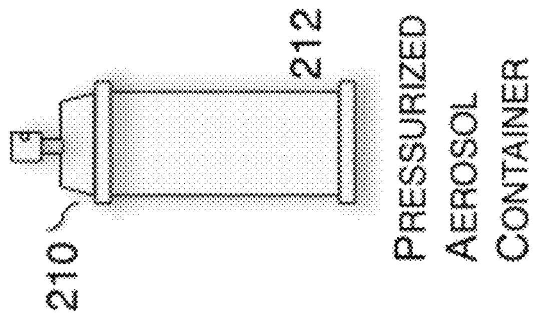
FIG. 3*c* shows a side view of a pressurized aerosol container using the cleaning preparation and dimethyl ether as a propellant in one embodiment of the present invention.

FIG. 3*c* shows an aerosol spray container 212 that holds the washer preparation at pressures above 3 bar. The top of the can is comprised of the mounting cup, the dip tube, the stem, the actuator, the spring and gasket. The aerosol spray container is pressure filled through the mounting cup with windshield washer preparation supplied at pressure to the pressurized packaging line 58 from the flow control valve 60 connected to the pressurized controllable fluid mixer.

One skilled in the art will appreciate that the present invention can be practiced by other than the above-described embodiments, which are presented herein for the purpose of illustration and not of limitation, and that the present invention is limited only by the claims that follow.

EXAMPLE

A cleaning preparation for use from −30° C. to 30° C. can be produced by the dehydration of methanol using a catalytic bed and a separation unit, yielding a fluid with a molar liquid composition of 65.8% water, 32.5% methanol and 1.7% dimethyl ether and 0.001% of dimethyl carbonate.

A feed stream that is 99.5% methanol and 0.5% water, with some trace impurities, is transferred into initial pressurization pump with a flow rate of 60 kg/hr at a temperature of 25° C. and a pressure of 10 bar. The fluid is passed through a heat exchanger, raising the temperature to 135° C., creating a liquid vapor mixture of 45% liquid and 55% vapor by weight. The mixture is then passed through a boiler section raising the temperature to 175° C. and shifting the feedstock to 100% vapor.

The methanol vapor is passed through a bed of aluminum oxide based catalyst ($\gamma$-$Al_2O_3$) capable of converting 80% of the methanol to dimethyl ether and water in a single pass through the reactor system. The reactor yields a mole fraction 39.8% of dimethyl ether and a mole fraction of 19.9% of methanol, the remainder consisting of water.

The resulting vapor stream is cooled with a combination of heat exchangers and cooling units, bringing the mixture to 104.85° C. before entering the separation unit. In this example, the separation unit consists of a single knock out drum and a single rectifying column. The vapor enters the knock out drum and is separated into two stream, the vapor stream flows at 42.4 kg/hr and is 89.8° C., with pressure reduced to 5 bar. The molar composition of the vapor stream is 70.8% dimethyl ether, 17.7% methanol and 11.5% water. The liquid stream exiting the bottom of the knock out drum flows at 17.6 kg/hr at a temperature of 89.8° C. and pressure of 5 bar. The molar composition of bottom stream from the knock out drum is 77.0% water, 22.7% methanol and 0.3% dimethyl ether.

The vapor stream from the knock out drum is cooled to 27° C. and fed into the 8th stage of a 12 stage rectifying column. The top of the column produces a vapor stream flowing out at 33.5 kg/hr with a molar content of 99.91% dimethyl ether and 0.09% water, with traces of methanol below a 90 parts per million. The vapor output from separation unit is chilled to condense at temperatures below 15° C. and delivered to the dimethyl ether holding tank. The liquid bottom stream from the rectifying column flows out at a rate of 8.9 kg/hr at a temperature of 48° C. and a pressure of 5 bar. The molar content of the liquid bottom stream from the rectifying column is 37% water, 57% methanol and 6% dimethyl ether.

The bottom liquid stream from the knock out drum and bottom liquid stream from the rectifying column are combined and exit the separation unit. The combined stream flows at 26.5 kg/hr at 74.3° C. with a pressure of 5 bar into the MeOH, DME & $H_2O$ tank, constituting the initial mixture that will constitute the cleaning preparation. The molar content of the mixture held in the MeOH, DME & $H_2O$ tank is 65.8% water, 32.5% methanol and 1.7% dimethyl ether.

The mixture passed through the controllable fluid mixer and is combined with a small amount of dimethyl carbonate, requiring no additional water, methanol and other additives. The cleaning preparation fills a jug container as described in FIG. 3*a*.

The invention claimed is:

1. A windshield washer preparation comprising water, methanol, dimethyl ether, dimethyl carbonate and additives selected from the group consisting of surfactants, dyes, fragrances, and foam reducing agents.

2. A windshield washer preparation of claim 1 comprising about 33% to about 60% by weight of methanol;

0.001% to about 3.5% by weight of dimethyl ether;

0.001% to about 4.5% by weight of dimethyl carbonate;

0.001% to about 4% by weight of additives selected from the group consisting of surfactants, dyes, fragrances, and foam reducing agents;

and at least 30% by weight water.

3. A windshield washer preparation of claim 1 comprising about 1% to about 32% by weight of methanol;

0.001% to about 2.5% by weight of dimethyl ether;

0.001% to about 31.5% by weight of dimethyl carbonate;

0.001% to about 4% by weight of additives selected from the group consisting of surfactants, dyes, fragrances, and foam reducing agents;

and at least 32% by weight water.

4. A windshield washer preparation of claim 1 comprising about 10% to about 15% by weight of methanol;

about 44% to about 50% by weight of dimethyl ether;

0.001% to about 15% by weight of dimethyl carbonate;

0.001% to 4% by weight of additives selected from the group consisting of surfactants, dyes, fragrances, and foam reducing agents;

and at least 18% by weight water.

5. A method for producing a windshield washer preparation composed of dimethyl ether, water, methanol, dimethyl carbonate and additional additives, comprising the continuous steps of:

a. withdrawing the methanol feed from a storage tank and pressurizing the methanol in liquid form with a pump to system pressure;

b. heating the liquid methanol by passage through a heat exchanger and a boiler systems;

c. converting the heated methanol partially to dimethyl ether and water by passage through a catalyst bed under an adjusted temperature and at a controlled rate;

d. cooling the resultant water, methanol and dimethyl ether mixture by passing it through a heat exchanger and a chiller unit;

e. passing through a separation unit, consisting of one ore more knock-out drums and one or more rectifying columns;

f. separating out pure dimethyl ether, leaving a desired mixture of water, methanol and dimethyl ether;

g. adding a desired amount of dimethyl carbonate, a solvent;

h. supplying selected additives to the mixture, thereby obtaining an aqueous windshield washer preparation of methanol, dimethyl ether, and dimethyl carbonate and selected additives.

6. A system used for dehydrating methanol, separating out excess dimethyl ether, adding dimethyl carbonate, adding extra water and selective additives, comprising:

a. a pressurizing pump for transferring methanol from a holding tank to the system input;

b. a heat exchanger that heats the methanol;

c. a supplemental heater that can raise the temperature to the required range for the chemical reactor;

d. a chemical reactor, e. a catalyst bed within the reactor under an adjusted temperature and pressure at a controlled rate;

f. a supplemental cooling system for the water, methanol and dimethyl ether;

g. a separation unit consisting of one or more knock-out drums and one or more rectifying columns;

h. a holding tank for the water, methanol and dimethyl ether mixture flowing from the bottom of the separation unit;

i. a holding tank for the purified dimethyl ether flowing from the top of the separation unit connected to a controllable fluid combiner;

j. a source of dimethyl carbonate, a solvent, added to a water, methanol and dimethyl ether mixture using a controllable fluid combiner;

k. a source of de-ionized water added to a water, methanol and dimethyl ether mixture using a controllable fluid combiner;

l. a source of additives, containing a desired mixture selected from the group consisting of surfactants, foam reducing agents, dyes and fragrances that are added to a water, methanol and dimethyl ether mixture using a controllable fluid combiner;

m. a bypass pipe connecting the methanol holding tank, via a flow control valve, acting as an additional source of methanol added to the water, methanol and dimethyl ether mixture using a controllable fluid combiner;

n. a product holding tank that is connected to the output of a controllable fluid combiner that creates a windshield washer preparation containing the desired amounts of water, methanol, dimethyl ether, dimethyl carbonate and additives;

o. a ambient pressure liquid packaging line capable of filling jug containers and trigger spray bottles using the washer preparation in the product holding tank;

p. a pressurized packaging line capable of filling aerosol cans using the pressure fill technique with a pressurized fluid source composed of contents from the product holding tank and the dimethyl ether tank.

7. A method for the dispensing the windshield washer preparation of claim 2 using an adjustable volume spray mechanism having a removal resistant neck closure on a bottle, wherein said mechanism is actuated by the human hand, is adjustable and can dispenses between 1 ml to 10 ml of liquid per actuation.

8. A method for dispensing the windshield washer of claim 3, using a jug container with removable cap, capable of storing up to 4 liters that can be poured accurately into a windshield washer fluid reservoir.

9. A method for dispensing the windshield washer preparation in claim 4 to a windshield surface by means of an aerosol spray can for containing and dispensing the cleaning preparation using the propellant pressure sustained by the amount of dimethyl ether contained in the can comprising:

a. a nearly cylindrical can having a wall of such a material that is not degraded by the cleaning preparation;

b. a dispensing valve on the can with a valve orifice adapted to be opened to dispense a desired quantity and rate of flow of the preparation of claim in spray or stream form in a manner such that the can will retain enough propellant pressure to expel substantially all of the dispensable windshield washer preparation in the can.

10. The method of claim 7, wherein the bottle is filled with the windshield washer preparation at atmospheric pressure.

11. The method of claim 8, wherein the jug is filled with the windshield washer preparation at atmospheric pressure.

12. The method of claim 9, wherein the aerosol cans are filled with the windshield washer preparation at pressures above 3 bar.

* * * * *